Patented Jan. 3, 1939

2,142,938

UNITED STATES PATENT OFFICE 2,142,938

DEFEATHERING COMPOUND

Harry W. Dippel, Teaneck, N. J., assignor, by mesne assignments, to Charles V. Rosenberger, Independence, Iowa No Drawing. Application January 8, 1937, Serial No. 119,624. Renewed April 1, 1938

9 Claims. (Cl. 17—45)

This invention relates to defeathering of poultry and has for its object to provide a material and a process for preparing the poultry for defeathering which is practicable and free of the objections possessed by prior suggestions.

It has long been appreciated that feathers and hair could be easily removed from poultry if a proper material could be provided. Many materials have been tried out. Some of them contain products which affect the taste or odor of the skin of the birds and are objectionable for that reason. Others require such high melting temperature that the skin is damaged during application.

In view of the difficulty of the work to be done and the vital importance that the carcass shall not be damaged in any way either by breaking or tearing the skin, by discoloration, or by adding a disagreeable odor, the trade has been slow to adopt what looks like a simple method of defeathering.

The composition should be capable of being effectively applied at a temperature which will not damage the carcass. It should readily penetrate through the feathers and form a firm coating without adhering too strongly to the skin. The coating should be flexible and yet stick tightly to the feathers and hair. Above all else the material must not discolor the skin or add a disagreeable odor or flavor.

It is also highly desirable that the composition have a boiling point above 212° F. so that any water absorbed from the feathers can be driven off during the remelting of the material without boiling the composition.

Ordinary paraffins have insufficient strength and cohesive force. Rosin, pitch and aromatic gums are highly objectionable on account of the flavor or odor which they may produce or impart when applied to the carcass of a bird.

Under the present invention these objections have been overcome and a satisfactory material discovered for coating the skin and feathers so that by removing the coating the feathers come off with ease without the skin being objectionably discolored or weakened or possessed of a disagreeable taste or odor.

Specifically this defeathering material includes about 80% by weight of a purified or specially refined paraffin wax having a designated melting point of 125° F. but which is actually found to have a melting point of about 122° F. In order to enhance the rubbery and tacky nature of this material, about 20% by weight of Russian ozokerite, grade B, or its equivalent and having a melting point of about 165° F. to 169° F. is mixed with the 80% of refined paraffin wax. This material is known as a type of natural paraffin and it gives to the mixture with the more common paraffin the desired characteristics for use as a defeathering material. The melting point of the mixture or resultant product is about 130° F.

In practice some of the large feathers which are easily removed may be plucked by hand if desired, though such is not thought necessary. The carcass usually while still warm is then sprayed with or dipped in a bath of the liquid material at a temperature of about 130° F. and then cooled. It should not be left in the bath any longer than necessary to impregnate the feathers. It is usually sufficient to merely dip the carcass in the bath and immediately remove it. Preferably the temperature of the material should not be lower than 129° F. Experience has shown that if the temperature of the material is much above 130° F. the skin is likely to become darkened after hanging a while, whereas this danger of darkening may be eliminated by keeping the temperature from rising much above 130° F.

At this temperature and with this material the carcass is covered with the coating material and enough penetrates the feathers to satisfactorily coat the skin sufficiently for the intended purpose.

If the coating material is of too low a melting point it is likely to be too soft to adhere to the feathers and hair.

If the melting point is too high the skin and flesh are likely to be damaged.

For the best general results I have found that the melting point of the composition should be between 125° F. and 135° F.

After the coating operation the feathers are easily removed with the coating material, such removal being preferably manual rather than by machine although machine operation may be used. The feathers and the wax with which they are coated may be then heated to melt the wax and drive off any water that may have been absorbed from the feathers. If the boiling point is below 212° F. it would be difficult to drive off the moisture which is sometimes absorbed from the feathers.

After the coating has been remelted the feathers may be strained out and the wax used over and over again.

It should be understood that the invention is not limited to the specific composition described but that the important features are set forth in the following claims.

I claim:

1. A defeathering compound adapted to be applied hot and including paraffin and ozokerite.

2. A defeathering compound including about 80% paraffin and about 20% ozokerite and having a melting point of approximately 130° F. and free from odor producing, flavor imparting and staining substance.

3. A defeathering composition comprising a mixture of paraffins and having a melting point of approximately 130° F. and free of rosin.

4. A defeathering composition comprising an odorless and non-staining waxy material having a melting point between 125° F. and 135° F. and highly adhesive and flexible at normal atmospheric temperature and free from odor imparting and flavor imparting ingredients, said composition including a mixture of paraffins having high and low individual melting points.

5. A defeathering composition comprising a mixture having a melting point of about 130° F. and composed of paraffin having a melting point of about 122° F. and paraffin having a melting point of about 167° F.

6. A defeathering compound adapted to be applied hot and including about 80% paraffin having a melting point of about 122° F. and about 20% of Russian ozokerite having a melting point of about 167° F. whereby the mixture melts at about 130° F.

7. A defeathering composition containing paraffin and ozokerite in the proportion of about 4 to 1 and free of odor, flavor and color imparting characteristics and having a melting point of about 130° F. and a boiling point above 212° F.

8. A defeathering compound containing a paraffin of low melting point and a paraffin of a naturally higher melting point and free of odor, stain and flavor imparting substances, the compound having a melting point high enough to permit liquid application at normal atmospheric temperature but too low to damage the skin of poultry and having a boiling point substantially above the boiling point of water.

9. A defeathering composition containing a mixture of a number of paraffins and having a melting point of approximately 130° F. and a boiling point sufficiently above the boiling point of water to permit water to be boiled off without boiling the composition.

HARRY W. DIPPEL.